United States Patent
Hock et al.

(10) Patent No.: US 7,234,561 B2
(45) Date of Patent: Jun. 26, 2007

(54) INDUSTRIAL TRUCK WITH A SWIVELLING SEAT

(75) Inventors: Wolfgang Hock, Grossostheim (DE); Heiko Sobolewski, Hergershausen (DE); Gerhard Zang, Mespelbrunn (DE)

(73) Assignee: Linde Aktiengesellschaft, Wiesbaden (DE)

( * ) Notice: Subject to any disclaimer, the term of this patent is extended or adjusted under 35 U.S.C. 154(b) by 426 days.

(21) Appl. No.: 10/735,245

(22) Filed: Dec. 12, 2003

(65) Prior Publication Data
US 2004/0173409 A1  Sep. 9, 2004

(30) Foreign Application Priority Data
Dec. 13, 2002  (DE)  ................ 102 58 383

(51) Int. Cl.
*B60K 26/00* (2006.01)
(52) U.S. Cl. ............... 180/326; 180/330; 297/215.15
(58) Field of Classification Search ............... 180/326, 180/330; 297/215.13, 215.15, 256.12; 384/490, 384/494
See application file for complete search history.

(56) References Cited

U.S. PATENT DOCUMENTS

| 4,155,593 | A | * | 5/1979 | Swenson et al. | ........ | 297/284.11 |
| 4,936,629 | A | * | 6/1990 | Young | .................... | 297/256.12 |
| 4,971,392 | A | * | 11/1990 | Young | .................... | 297/256.12 |
| 5,183,312 | A | * | 2/1993 | Nania | .................... | 297/256.12 |
| 5,921,340 | A | | 7/1999 | Linde | | |
| 6,021,989 | A | | 2/2000 | Morita et al. | | |
| 6,164,396 | A | * | 12/2000 | Matsufuji | .................. | 180/6.34 |
| 6,276,749 | B1 | | 8/2001 | Okazawa | | |
| 6,446,758 | B1 | | 9/2002 | Schatz | | |
| 6,575,420 | B2 | * | 6/2003 | Yoshida et al. | ............. | 248/425 |

FOREIGN PATENT DOCUMENTS

| DE | 196 50 338 A1 | 9/1997 |
| EP | 0 515 275 A1 | 11/1992 |
| EP | 0960850 | 12/1999 |
| EP | 1 110 805 A1 | 6/2001 |
| EP | 1260477 | 11/2002 |
| FR | 2738781 | 3/1997 |
| GB | 485320 | 5/1938 |
| WO | WO 84/00525 | 2/1984 |

* cited by examiner

*Primary Examiner*—Paul N. Dickson
*Assistant Examiner*—Toan C. To
(74) *Attorney, Agent, or Firm*—The Webb Law Firm

(57) ABSTRACT

An industrial truck, such as a forward control fork-lift truck, has dual pedal control with one pedal (5) assigned to the operator's right leg for forward travel and another pedal (6) assigned to the operator's left leg for reverse travel. A driver's seat (2) can be swivelled about an approximately vertical axis of rotation (D). In order to decrease the expenditure and space required for the driver's seat (2) to swivel, the driver's seat (2) can be swivelled in a clockwise direction from a normal position associated with the forward travel direction by an amount of at most 15 to 25 degrees, such as 15 to 20 degrees, such as about 17 degrees, into an oblique position associated with the reverse travel direction. The axis of rotation (D) of the driver's seat (2) can be in the region of the seat front edge, within the seat contour.

15 Claims, 5 Drawing Sheets

INDUSTRIAL TRUCK WITH A SWIVELLING SEAT

CROSS REFERENCE TO RELATED APPLICATION

This application corresponds to German Application No. 102 58 383.8 filed Dec. 13, 2002, which is herein incorporated by reference in its entirety.

BACKGROUND OF THE INVENTION

1. Field of the Invention

The invention relates to an industrial truck, such as a forward control fork-lift truck, having dual pedal control with a pedal assigned to the right leg of an operator for forward travel and a pedal assigned to the left leg of the operator for reverse travel. The truck has a driver's seat which can be swivelled about an approximately vertical axis of rotation.

2. Technical Considerations

Rotatable drivers' seats in industrial trucks are used to improve vehicle ergonomics, particularly during the transport of heavy and/or high loads. In this operating state, reverse travel is typically used in order to improve the view of the roadway which could be blocked by the load on the front of the truck.

An industrial truck is disclosed in DE 196 50 338 A1. There, the driver's seat can be swivelled about an axis of rotation arranged in the region of the pedal for the reverse travel direction. The angle of swivel has a magnitude between 30 and 45 degrees. This angle of swivel firstly assumes a specific amount of overall space in the industrial truck and, secondly, either the pedals also have to be swivelled or a two-part operating surface on the pedal is required for the reverse travel direction.

The present invention provides an industrial truck of the general type described above but which enables the driver's seat to be swivelled with reduced expenditure and space requirements.

SUMMARY OF THE INVENTION

In one aspect of the invention, the driver's seat is capable of swivelling in a clockwise direction from a normal position, associated with the forward travel direction, by an amount of at most 15 to 25 degrees, such as 15 to 20 degrees, into an oblique position associated with the reverse travel direction.

Surprisingly, the swivelling of the driver's seat, which is low in relation to the swivelling ranges known and recommended in the known art, is sufficient to achieve a considerable ergonomic improvement for the operator during reverse travel of the truck.

Thus, when the driver's seat is in the oblique position and given a rotation of the upper body required for reverse travel, the driver's spinal column is rotated to a lesser extent than in the normal position of the driver's seat. At the same time, in conjunction with an additional turning of the head of the operator, the field of view is enlarged to such an extent that the industrial truck can be driven backwards with good visibility. As compared to reverse travel with the driver's seat in the normal position, the ergonomics are, therefore, improved by relieving the load on the back and neck musculature of the driver.

In this case, by virtue of the invention, it is not necessary to accommodate a second set of pedals on the industrial truck or to swivel the existing set of pedals. Instead, the operator can still reach the pedal associated with the reverse travel direction operated by the left leg even in the oblique position of the driver's seat, ergonomically beneficially and without constraint.

In one embodiment of the invention, a maximum angle of swivel of approximately 17 degrees is provided for the driver's seat of the industrial truck.

In order to keep the space required for the swivelling of the driver's seat to a minimum and, at the same time, to achieve beneficial ergonomic conditions, the axis of rotation of the driver's seat can be advantageously arranged in the region of the seat front edge, within the seat contour.

According to a beneficial refinement of the invention, the driver's seat can have an armrest to which an unlocking element is fixed. The unlocking element can be operatively connected to a locking device that secures the driver's seat against rotation, at least in the normal position and in the oblique position. As a result, the rotary function of the driver's seat can be triggered in a simple way by means of actuating the unlocking element, which can be designed as a lever.

Furthermore, various control elements for the operating functions of the industrial truck can be fitted to the armrest. In this case, the small angle of swivel of the driver's seat also proves to be advantageous since electrical and/or hydraulic control lines are twisted only slightly when the driver's seat is swivelled.

A development of the invention which is expedient with regard to secure functioning of the remote unlocking element and which requires little expenditure on production provides for the unlocking element to be operatively connected to the locking device by means of a conventional Bowden cable.

Advantageously arranged between the driver's seat and a mounting surface provided for the vertical support of the driver's seat, for example an engine cover, is an adapter unit which has a bearing plate connected to the driver's seat and a supporting plate connected to the mounting surface. The bearing plate can be provided with at least two curved ball channels, the center of whose curvature coincides with the axis of rotation of the driver's seat and in which in the channels a row of balls is retained on the underside of the bearing plate and bears against the supporting plate.

An adapter unit according to the invention can be produced and mounted in a simple manner. Furthermore, it permits industrial trucks to be retrofitted with a rotatable driver's seat.

If at least one closed, arcuate groove is machined into the bearing plate and its arc length limits the swivelling range of the driver's seat, no special end stops are needed.

BRIEF DESCRIPTION OF THE DRAWINGS

Further advantages and details of the invention will be explained in more detail using the exemplary embodiment illustrated in the schematic figures, in which.

DESCRIPTION OF THE PREFERRED EMBODIMENTS

All ranges disclosed herein are to be considered to include all subranges subsumed therein.

In a driver's cab 1 of an industrial truck according to the invention there is a driver's seat 2. The driver's seat 2 is fixed to a mounting surface 3, such as an engine cover. In the illustrated exemplary embodiment, the industrial truck is configured as a forward control fork-lift truck. In the forward viewing direction of the operator who, during normal operation of the industrial truck is seated on the driver's seat 2, the load to be transported is arranged on a conventional load-lifting device (not illustrated in the figures). If the driver's vision is hampered by the load on the front of the truck, the forward control fork-lift truck is typically operated in the reverse travel direction so that the driver has a clearer field of vision.

Figure 1:
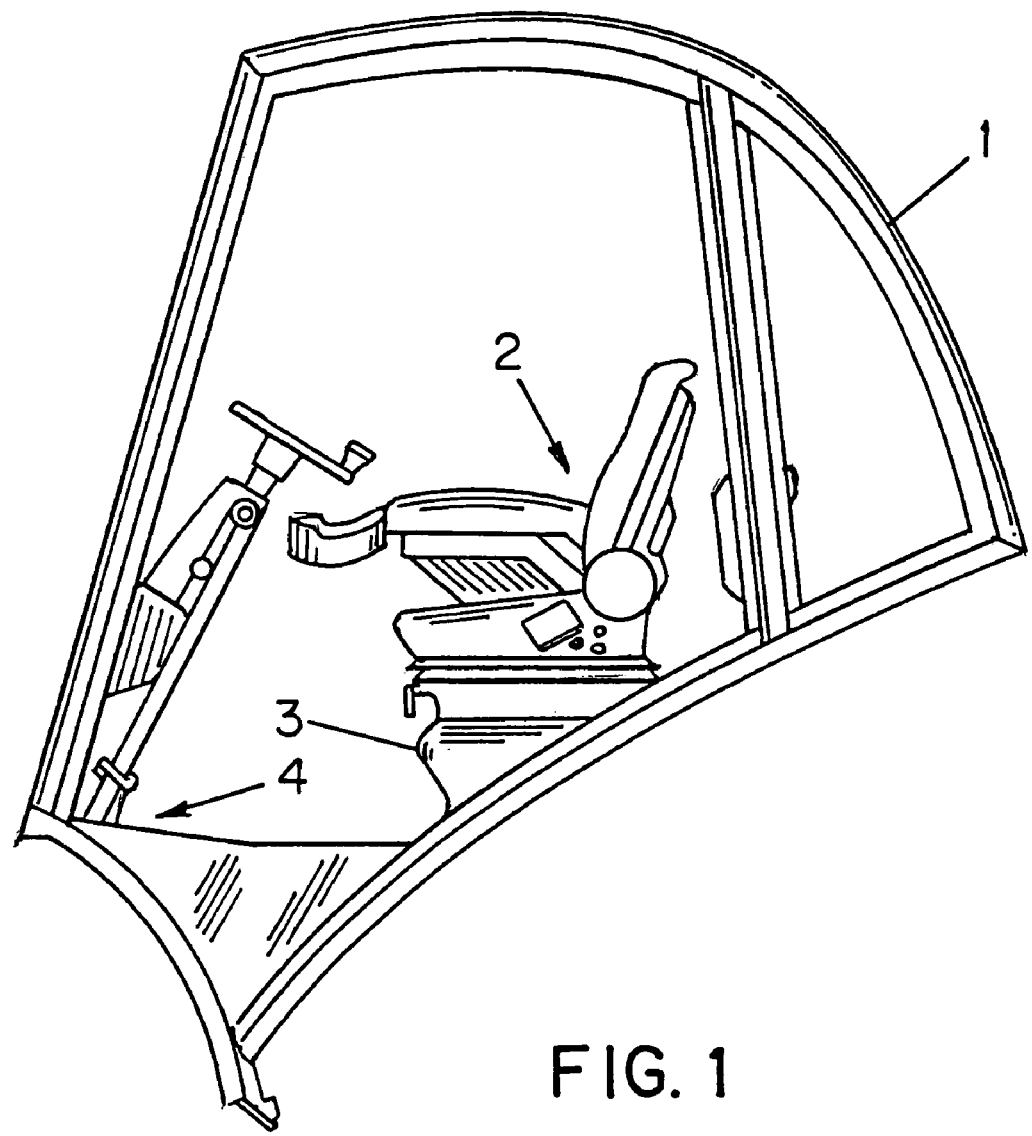
FIG. 1 shows a side view of the driver's cab of an industrial truck according to the invention.
Figure 2:
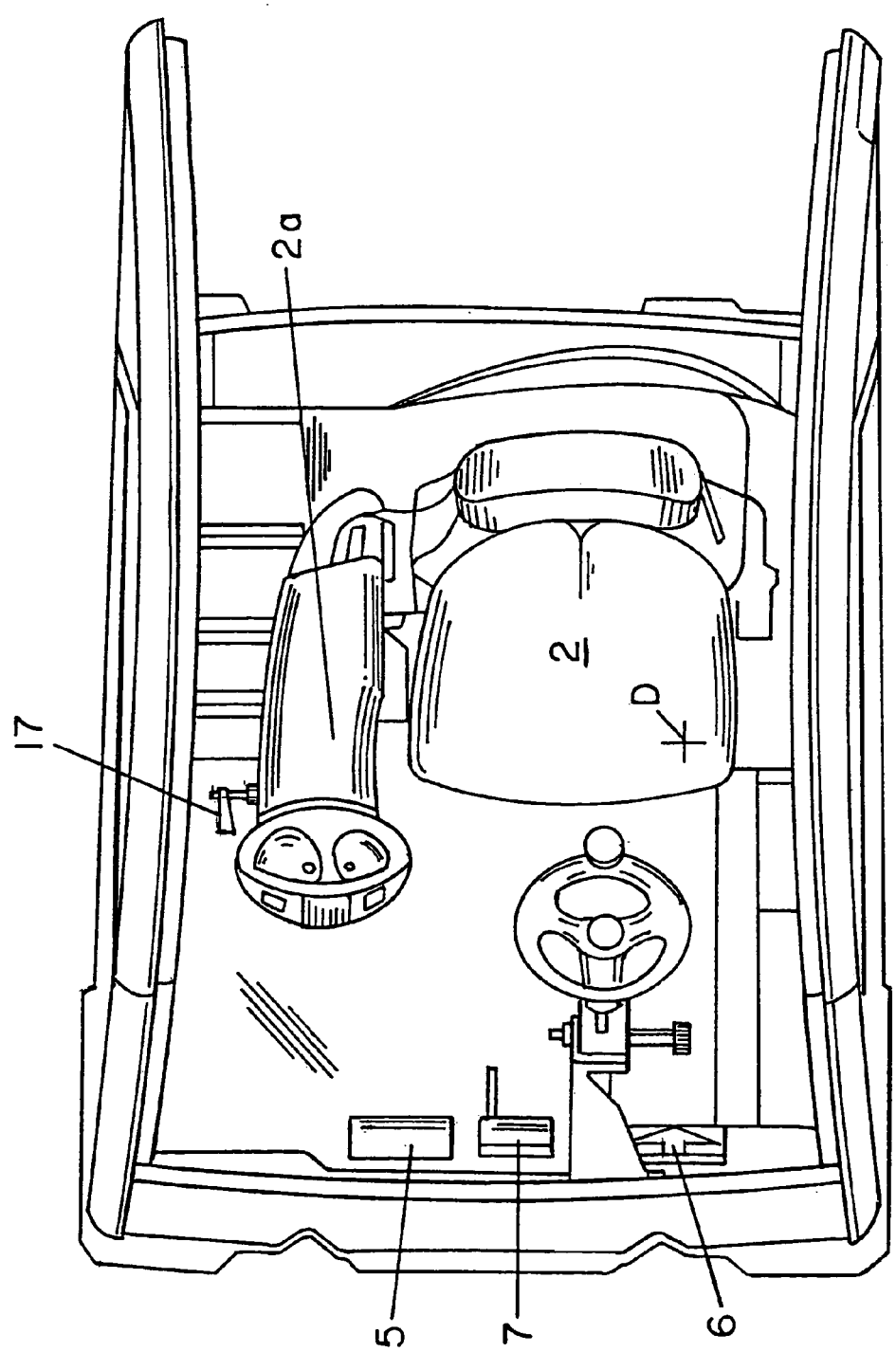
FIG. 2 shows a plan view of the driver's cab according to FIG. 1 with the roof panel removed, the dashboard removed, and the driver's seat in a normal position.
Figure 3:
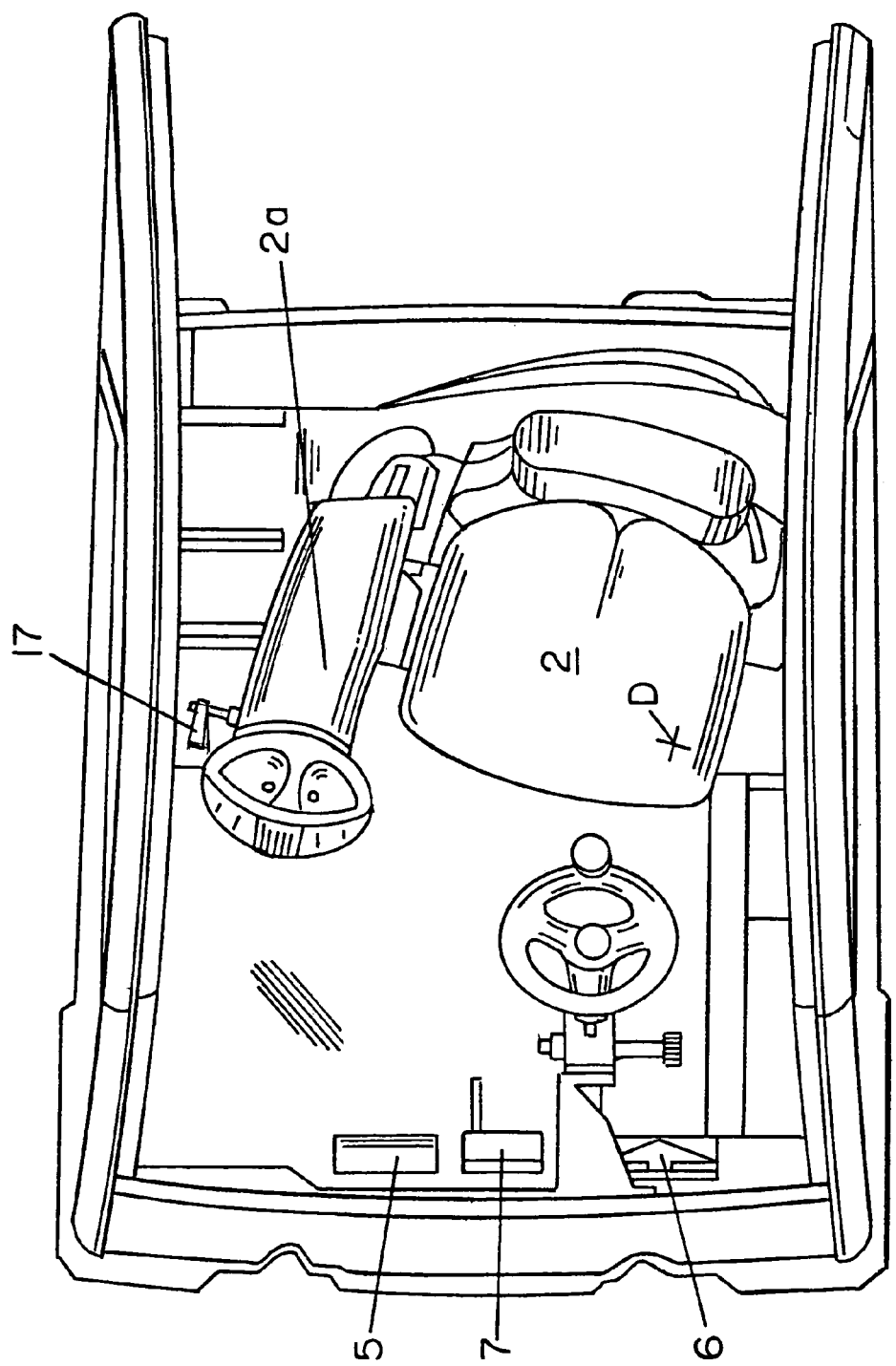
FIG. 3 shows a plan view of the driver's cab according to FIG. 1 with the roof panel removed, the dashboard removed, and the drivers seat in an oblique position.

As is apparent in particular from a combined inspection of FIGS. 1-3, in a foot space 4 in front of the driver's seat 2 there is a pedal 5 assigned to the forward travel direction and a pedal 6 assigned to the reverse travel direction. An arrangement of this type is used in particular in industrial trucks which have a hydrostatic traction drive. In this case, the two pedals 5 and 6 are operated alternately. The travelling industrial truck is automatically braked by releasing the operated pedal 5 or 6.

A more powerful braking action is possible by means of what is known as "reversing". In this case, during the forward travel, the pedal 6 for the reverse travel direction is operated or, conversely, during reverse travel, the pedal 5 for the forward travel direction is operated. For safety reasons, there is additionally a brake pedal 7, which is conventionally arranged between the forward and reverse pedals 5 and 6.

FIG. 2 shows the driver's seat 2 in the normal position for forward movement in an alignment which is substantially parallel to the longitudinal mid-axis of the industrial truck. In this case, the driver can operate all the pedals in the foot space 4 in the usual way.

FIG. 3 shows the driver's seat 2 in the oblique position (for rearward movement) according to the invention, in which the seat 2 has been swivelled in a clockwise direction in the range of 15 to 25 degrees, such as 17 degrees, in relation to the normal position about an axis of rotation D arranged within the seat contour in the region of the seat front edge and to the left of the seat center. In this case, the pedal 6 which is assigned to the reverse travel direction of the industrial truck according to the invention can still be reached easily by the operator. The left leg of the operator will be rotated only slightly. In addition, the brake pedal 7 arranged between the two pedals 5 and 6 can be operated without difficulty.

Although the driver's seat 2 has been swivelled only slightly about the axis of rotation D, the result is a considerable improvement in the visibility to the rear. At the same time, the operator has to rotate his upper body less far than in conventional trucks, which is ergonomically beneficial.

Figure 4:
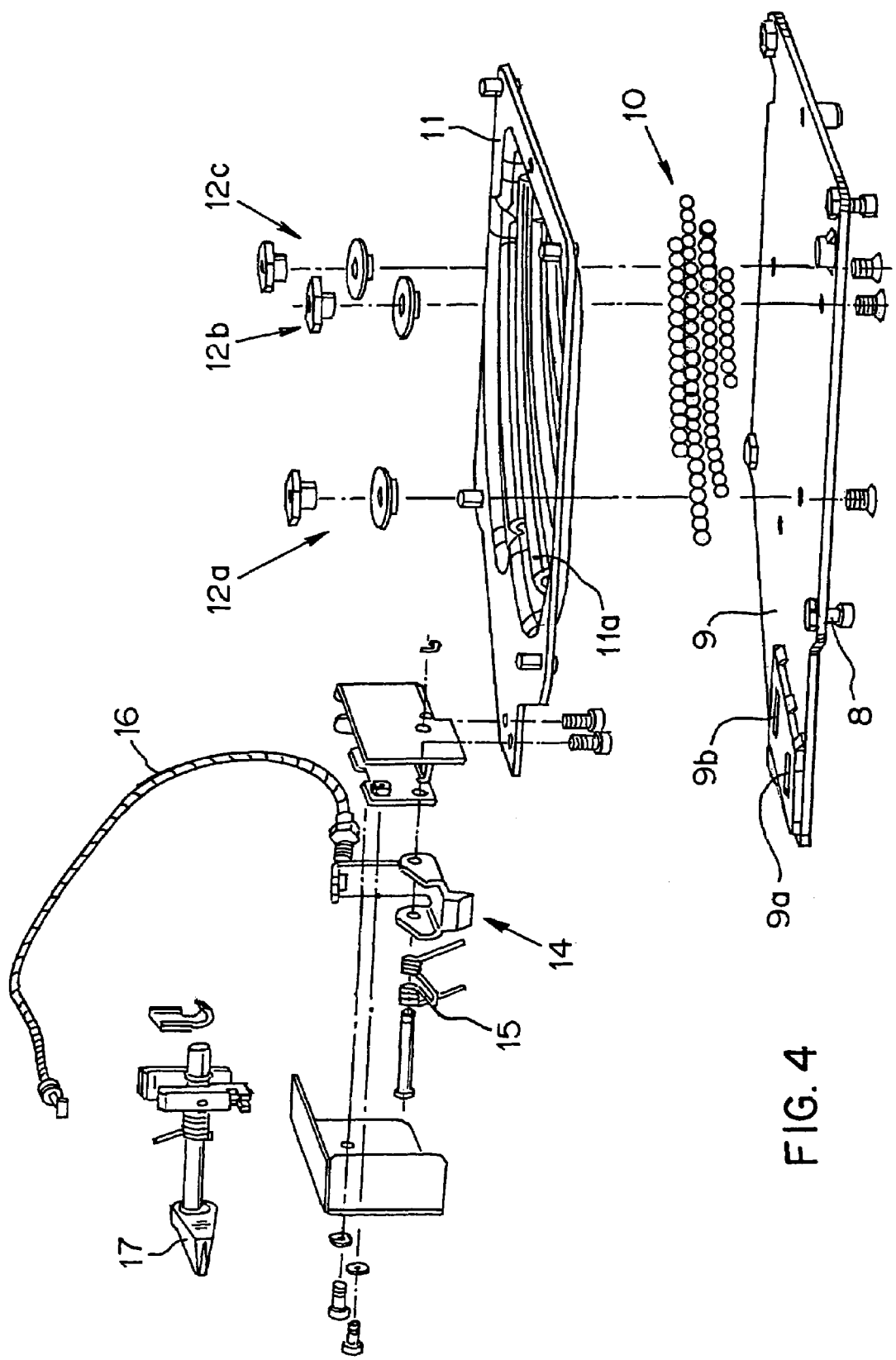
FIG. 4 shows an exploded illustration of an adapter unit of the invention.
Figure 5:
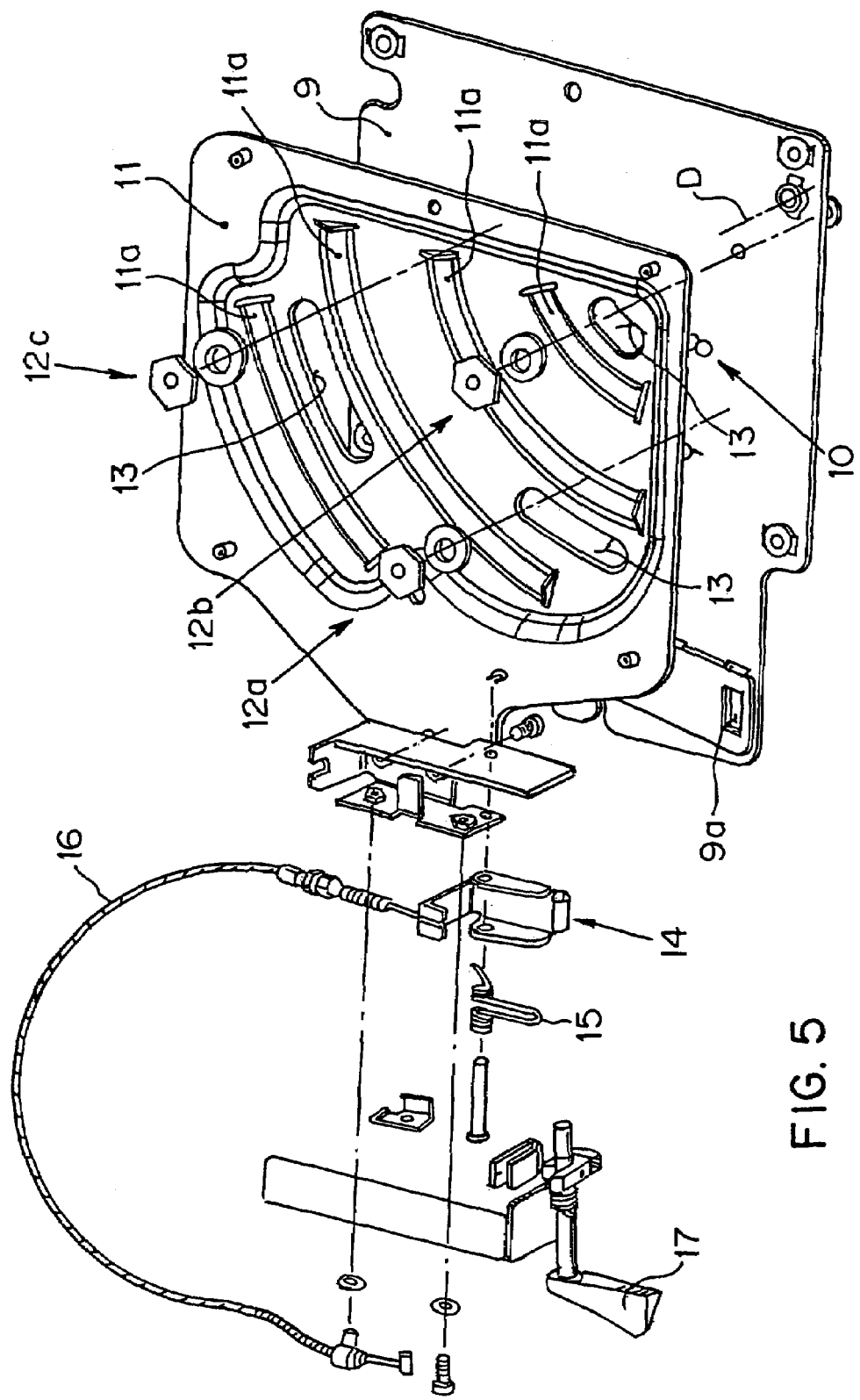
FIG. 5 shows the exploded illustration from FIG. 4 from a different perspective.

FIG. 4 shows a perspective illustration (expanded) of a locking device and an adapter unit of the invention, which can be arranged vertically between the driver's seat 2 and the engine cover (mounting surface 3) and which makes it possible for the driver's seat 2 to rotate.

The adapter unit has a supporting plate 9 which is connected to the mounting surface 3 by any conventional means, such as screws 8, and on which, by means of a plurality of rows of balls 10, a bearing plate 11 connected to the driver's seat 2 can be rotated. The rows of balls 10 are located in curved ball channels 11a which are integrally moulded on the bearing plate 11.

The supporting plate 9 is connected to the bearing plate 11 to form a mounting unit in order to prevent the rows of balls 10 located on the underside of the bearing plate 11 falling out of the ball channels 11a. For this purpose, connections, such as three screw connections 12a, 12b, 12c, are provided, which each extend through closed, arcuate grooves 13 in the bearing plate 11. The angle of swivel of the bearing plate 11 with respect to the supporting plate 9 can be limited to be in the range of 15 to 25 degrees, such as 17 degrees, according to the invention by the arc length of the grooves 13.

The center of curvature of the ball channels 11a coincides with the axis of rotation D of the driver's seat 2. In a manner analogous to this, the center of curvature of the closed grooves 13 also coincides with the axis of rotation D.

In order to be able to fix the adapter unit mounted on the industrial truck, and therefore the driver's seat 2, in the normal position and in the oblique position, a locking device is provided, whose construction will be described briefly. Two latching openings 9a, 9b are machined into the supporting plate 9 and are configured to engage with a locking element 14 fixed to the bearing plate 11 such that it can be tilted. The locking element 14 is loaded (biased) by a spring 15 in the direction of the closed position, that is to say in the direction of the latching openings 9a, 9b, and can be pressed in the open position by means of a Bowden cable 16, which is connected to an unlocking element 17 formed as a lever.

The unlocking element 17 can be fixed to an armrest 2a which is connected to the driver's seat 2 and to which control elements for the operating functions of the industrial truck are fitted.

By operating the lever-like unlocking element 17, the locking element 14 is moved out of engagement with the latching opening 9a or 9b and the driver's seat 2 can be swivelled. If the unlocking element 17 is released again and the locking element 14 is aligned with the latching opening 9a or 9b, it is brought into engagement with the latching opening 9a or 9b again by the force of the spring 15 and, as a result, the driver's seat 2 is locked.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck having dual pedal control, comprising:
    a first stationary pedal for forward travel and a second stationary pedal for reverse travel; and
    a driver's seat which can be swivelled about an approximately vertical axis of rotation, wherein the driver's seat is capable of swivelling in a clockwise direction from a normal position associated with a forward travel direction by an amount in the range of at most 15 to 25 degrees into an oblique position associated with a reverse travel direction,
    wherein the first and second pedals are located in a foot space of the truck, with the first pedal located to the right of the second pedal with respect to the normal position, wherein arranged between the driver's seat and a mounting surface provided for vertical support of the driver's seat is an adapter unit, the adapter unit comprising:

a bearing plate connected to the driver's seat; and a supporting plate connected to the mounting surface, wherein the bearing plate includes at least two curved ball channels, the center of whose curvature coincides with the axis of rotation of the driver's seat and in which in the channels a row of balls is retained on the underside of the bearing plate and bears against the supporting plate.

2. The industrial truck according to claim 1, wherein a maximum angle of swivel of the driver's seat is approximately 17 degrees.

3. The industrial truck according to claim 1, wherein the axis of rotation of the driver's seat is defined in a region of the seat front edge, within a seat contour.

4. The industrial truck according to claim 1, wherein the driver's seat has an armrest to which an unlocking element is fixed, wherein the unlocking element is operatively connected to a locking device which secures the driver's seat against rotation at least in the normal position and in the oblique position.

5. The industrial truck according to claim 4, wherein the unlocking element is operatively connected to the locking device by a cable.

6. The industrial truck according to claim 2, wherein the axis of rotation of the driver's seat is defined in a region of the seat front edge, within a seat contour.

7. The industrial truck according to claim 1, wherein at least one closed, arcuate groove is formed in the bearing plate, its arc length limiting the swivelling range of the driver's seat.

8. The industrial truck according to claim 1, wherein the industrial truck is a forward control fork-lift truck.

9. The industrial truck according to claim 1, wherein the driver's seat is capable of swivelling in the range of at most 15 to 20 degrees from the normal forward travel position.

10. An industrial truck having dual pedal control, comprising:

a pedal for forward travel and a pedal for reverse travel; and a driver's seat which can be swivelled about an approximately vertical axis of rotation, wherein the driver's seat is capable of swivelling in a clockwise direction from a normal position associated with a forward travel direction by an amount in the range of at most 15 to 25 degrees into an oblique position associated with a reverse travel direction, wherein arranged between the driver's seat and a mounting surface provided for vertical support of the driver's seat is an adapter unit, the adapter unit comprising:

a bearing plate connected to the driver's seat; and a supporting plate connected to the mounting surface, wherein the bearing plate includes at least two curved ball channels, the center of whose curvature coincides with the axis of rotation of the driver's seat and in which in the channels a row of balls is retained on the underside of the bearing plate and bears against the supporting plate.

11. The industrial truck according to claim 10, wherein at least one closed, arcuate groove is formed in the bearing plate, its arc length limiting the swivelling range of the driver's seat.

12. The industrial truck according to claim 10, wherein a maximum angle of swivel of the driver's seat is approximately 17 degrees.

13. The industrial truck according to claim 10, wherein the axis of rotation of the driver's seat is defined in a region of the seat front edge, within a seat contour.

14. The industrial truck according to claim 10, wherein the driver's seat has an armrest to which an unlocking element is fixed, wherein the unlocking element is operatively connected to a locking device which secures the driver's seat against rotation at least in the normal position and in the oblique position.

15. The industrial truck according to claim 14, wherein the unlocking element is operatively connected to the locking device by a cable.

* * * * *